(12) United States Patent
Uleski et al.

(10) Patent No.: US 7,028,541 B2
(45) Date of Patent: Apr. 18, 2006

(54) TIRE PRESSURE SENSING COMPONENT FOR DETECTING AIR PRESSURE AND RELATED METHOD

(75) Inventors: Michael A. Uleski, Roseville, MI (US); John S. Nantz, Brighton, MI (US)

(73) Assignee: Lear Corporation, Southfield, MI (US)

( * ) Notice: Subject to any disclaimer, the term of this patent is extended or adjusted under 35 U.S.C. 154(b) by 69 days.

(21) Appl. No.: 10/700,718

(22) Filed: Nov. 4, 2003

(65) Prior Publication Data

US 2005/0092076 A1    May 5, 2005

(51) Int. Cl.
*B60C 23/02* (2006.01)
(52) U.S. Cl. ........................ 73/146.8; 73/146
(58) Field of Classification Search ....... 73/146–146.8, 73/700–756; 340/444–447
See application file for complete search history.

(56) References Cited

U.S. PATENT DOCUMENTS

| | | | |
|---|---|---|---|
| 4,157,530 A | 6/1979 | Merz | |
| 4,163,208 A | 7/1979 | Merz | |
| 4,310,826 A | 1/1982 | D'Angiolillo | |
| 4,742,857 A | 5/1988 | Gandhi | |
| 4,783,993 A | 11/1988 | Lothar et al. | |
| 5,035,137 A | 7/1991 | Burkard et al. | |
| 5,063,774 A | 11/1991 | Burkard et al. | |
| 5,065,134 A | 11/1991 | Schmid et al. | |
| 5,119,066 A * | 6/1992 | Ballyns .................. | 340/442 |
| 5,606,123 A | 2/1997 | Rabizadeh | |
| 5,717,135 A | 2/1998 | Fiorletta et al. | |
| 5,844,131 A | 12/1998 | Gabelmann et al. | |
| 6,003,381 A * | 12/1999 | Kato ...................... | 73/721 |
| 2002/0168795 A1 | 11/2002 | Schuurmans | |
| 2003/0079537 A1 | 5/2003 | Luce | |

FOREIGN PATENT DOCUMENTS

DE    39 06 399 A1    9/1990

\* cited by examiner

*Primary Examiner*—Max Noori
*Assistant Examiner*—Jermaine Jenkins
(74) *Attorney, Agent, or Firm*—Brooks Kushman P.C.

(57) ABSTRACT

In at least one embodiment, the present invention relates to a tire pressure monitor system located within the interior of a tire. The system comprises a housing having a wall forming a cavity and an interior wall forming an opening in fluid communication with the cavity, a tire pressure sensor located within the housing cavity, and a pressure cap inserted into the housing opening. The tire pressure sensor has an orifice for helping to sense tire pressure. The pressure cap comprises a wall having a portion that contacts the sensor and extends around the sensor orifice.

19 Claims, 4 Drawing Sheets

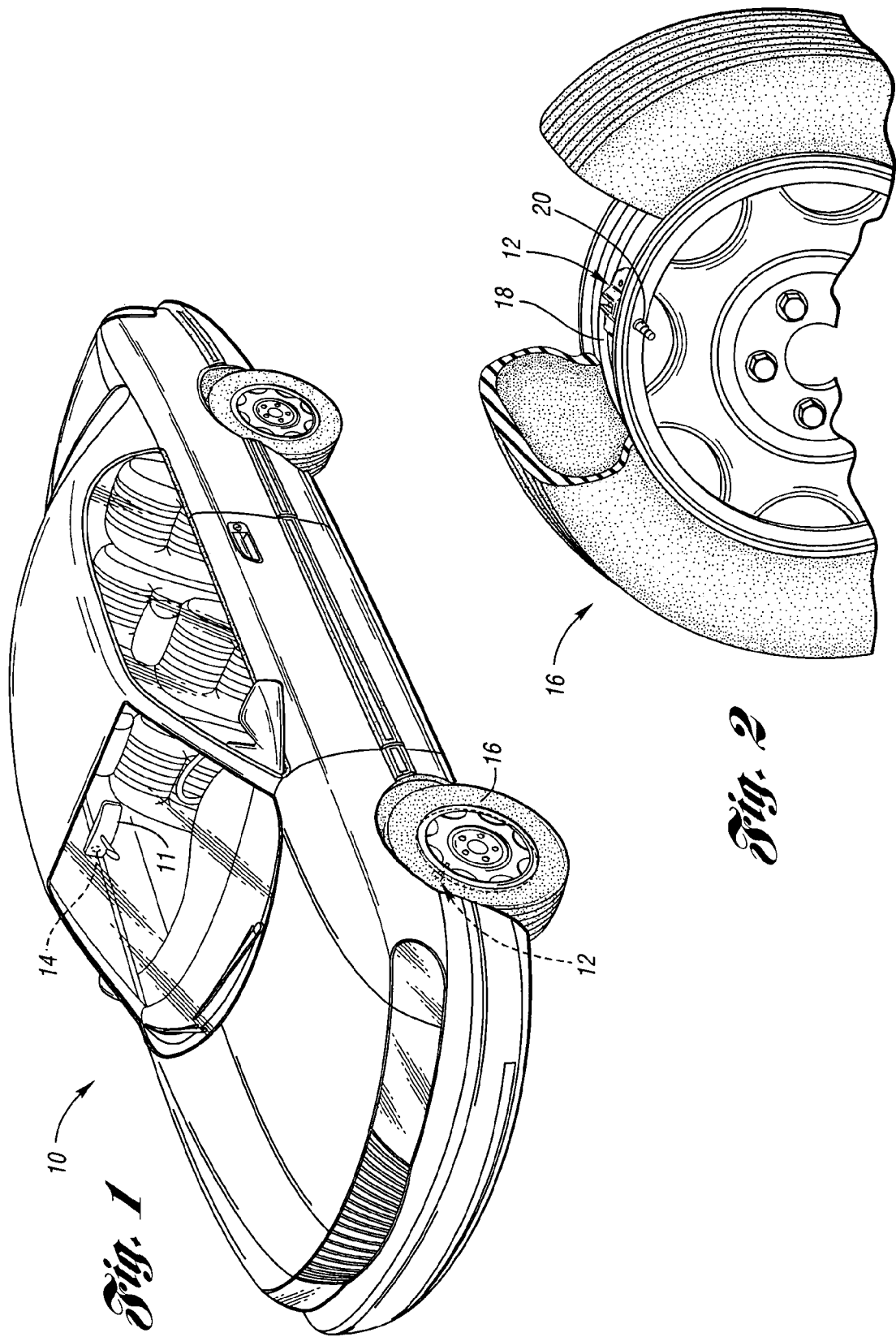

US 7,028,541 B2

TIRE PRESSURE SENSING COMPONENT FOR DETECTING AIR PRESSURE AND RELATED METHOD

BACKGROUND OF THE INVENTION

1. Field of the Invention

The present invention relates to a tire pressure monitor.

2. Background Art

Tire pressure monitors incorporated in vehicles having pneumatic tires can be used to continuously or periodically measure the air pressure in the tires and to help alert the driver should the pressure in one of the tires fall below or rise above a predetermined value.

Tire pressure monitors typically include a housing which contains a circuit board, a sensor mounted to the circuit board, a power source such as a battery, and an antenna or other receiving device. The sensor includes an orifice that helps to sense the pressure of the tire. In the prior art, the sensor orifice faces the circuit board. To prevent the components within the housing from breaking away from the circuit board during tire rotation, it is known in the art to inject a liquid potting compound into the housing. The potting compound solidifies and encapsulates the components within the housing.

Some current tire pressure monitors that utilize potting compounds have experienced problems with the potting compound contaminating the orifice on the sensor. If the potting compound were to enter the orifice, the sensor port could become clogged and non-operative.

To combat this problem, one existing technology utilizes a gortex fabric that is cemented to the bottom side of the circuit board and covered by an adhesive. The gortex covers an orifice in the circuit board that is aligned with the sensor orifice. When the potting compound is injected into the housing, the compound flows around the gortex seal, preventing contamination of the sensor orifice. Although this solution helps to prevent clogging of the sensor orifice, it requires a more labor intensive method during assembly of the tire pressure monitor due to the addition of the adhesive and gortex fabric. In addition, it is possible that the components within the monitor housing can be subjected to bump and shock during the assembly of the gortex fabric to the circuit board orifice, causing displacement of the components.

It would be desirable to develop an apparatus and method that would reduce the amount of labor required in assembling tire pressure monitor systems while still providing a means for protecting the sensor orifice from contamination due to the potting compound.

SUMMARY OF THE INVENTION

In at least one embodiment, the present invention provides a tire pressure monitor system located within the interior of a tire. The system comprises a housing having a wall forming a cavity and an interior wall forming an opening in fluid communication with the cavity. The system further comprises a tire pressure sensor located within the housing cavity. The sensor has an orifice for helping to sense tire pressure. The system further comprises a pressure cap inserted into the housing opening. The pressure cap comprises a wall having a portion that contacts the sensor and extends around the sensor orifice.

In at least another embodiment, the present invention further provides a pressure cap for use with a tire pressure monitor comprising a housing having a wall forming a cavity and an opening in fluid communication with the cavity and an air pressure sensor within the housing. The cap comprises a cap wall which when inserted within the opening extends between the housing wall and the sensor and extends around the sensor orifice.

In at least another embodiment, the present invention further provides a method for manufacturing a tire pressure monitoring system located within the interior of a tire. The method comprises providing a housing having a wall forming a cavity and an interior wall forming an opening in fluid communication with the cavity, locating a tire pressure sensor within the housing cavity, and locating a pressure cap within the housing opening. The sensor has an orifice for helping to sense tire pressure and the pressure cap comprising a wall having a portion that contacts the sensor and extends around the sensor orifice.

The above features, and other features and advantages of the present invention are readily apparent from the following detailed descriptions thereof when taken in connection with the accompanying drawings.

BRIEF DESCRIPTION OF THE DRAWINGS

The invention will now be described in greater detail in the following way of example only and with reference to the attached drawing, in which:

FIG. 1 is a perspective view of a vehicle having a tire pressure monitoring system made in accordance with the present invention;

FIG. 2 is a perspective view of the tire pressure monitor made in accordance with the present invention attached to the interior of a vehicle wheel rim of a tire having a portion cut out;

DETAILED DESCRIPTION OF THE PREFERRED EMBODIMENT(S)

Figure 3:
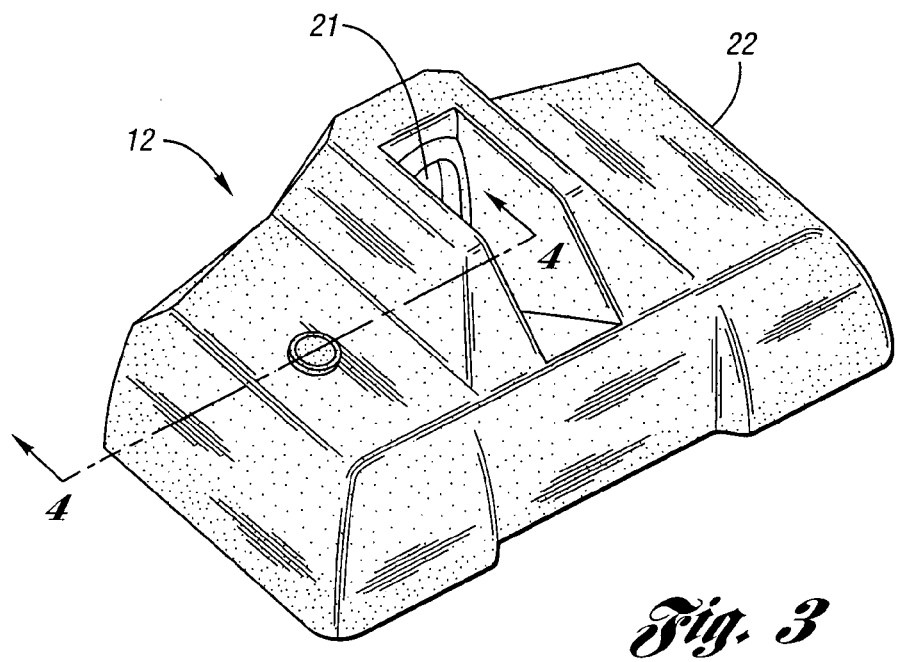
FIG. 3 is a perspective view of the tire pressure monitor made in accordance with the present invention.

As required, detailed embodiments of the present invention are disclosed herein. However, it is to be understood that the disclosed embodiments are merely exemplary of the invention that may be embodied in various and alternative forms. The Figures are not necessarily to scale, some features may be exaggerated or minimized to show details of particular components. Therefore, specific structural and functional details disclosed herein are not to be interpreted as limiting, but merely as a representative bases for the claims and/or as a representative basis for teaching one skilled in the art to variously employ the present invention.

At least one embodiment of the present invention relates to a tire pressure monitoring that is attached to a vehicle wheel rim and configured to receive a tire valve stem. In particular, the present invention provides a tire pressure monitor that includes a pressure cap. The pressure cap can alleviate the need for the gortex fabric previously used to protect sensor ports from contamination during injection of the liquid potting compound into the housing cavity.

Referring to FIG. 1, a vehicle 10 is shown utilizing a tire pressure monitoring system made in accordance with the present invention. The tire pressure monitor 12 is shown attached inside a vehicle wheel 16. The tire pressure monitor 12, in response to exceeding or falling below predetermined pressure values, can send a signal to an LED indicator 14 located within the vehicle to alert the driver of the potential of low or high tire pressure. In the embodiment shown in FIG. 1, the LED indicator 14 is located on the rearview mirror 11 of the vehicle 10, but it is possible for the indicator to be placed in other locations within the vehicle, such as on the instrument panel. Furthermore, it should be understood that another type of signal, such as an audible alert, could be used instead of or in connection with the LED indicator 14.

FIG. 2 shows in greater detail the attachment of the tire pressure monitor 12 to the vehicle wheel 16. The tire pressure monitor 12 is mounted within the interior 18 of the wheel 16. In the embodiment shown, the wheel 16 has a valve stem 20 which is inserted through a housing opening 21 (FIG. 3) in the tire pressure monitor 12. The valve stem 20 also has a portion that protrudes through to the exterior of the wheel 16 (FIG. 2). This can help the tire pressure monitor 12 to remain relatively stationary during tire rotation. As is known in the art, the portion of the valve stem 20 that projects to the exterior of the wheel 16 allows for typical inflation and deflation of the tire.

Figure 4:
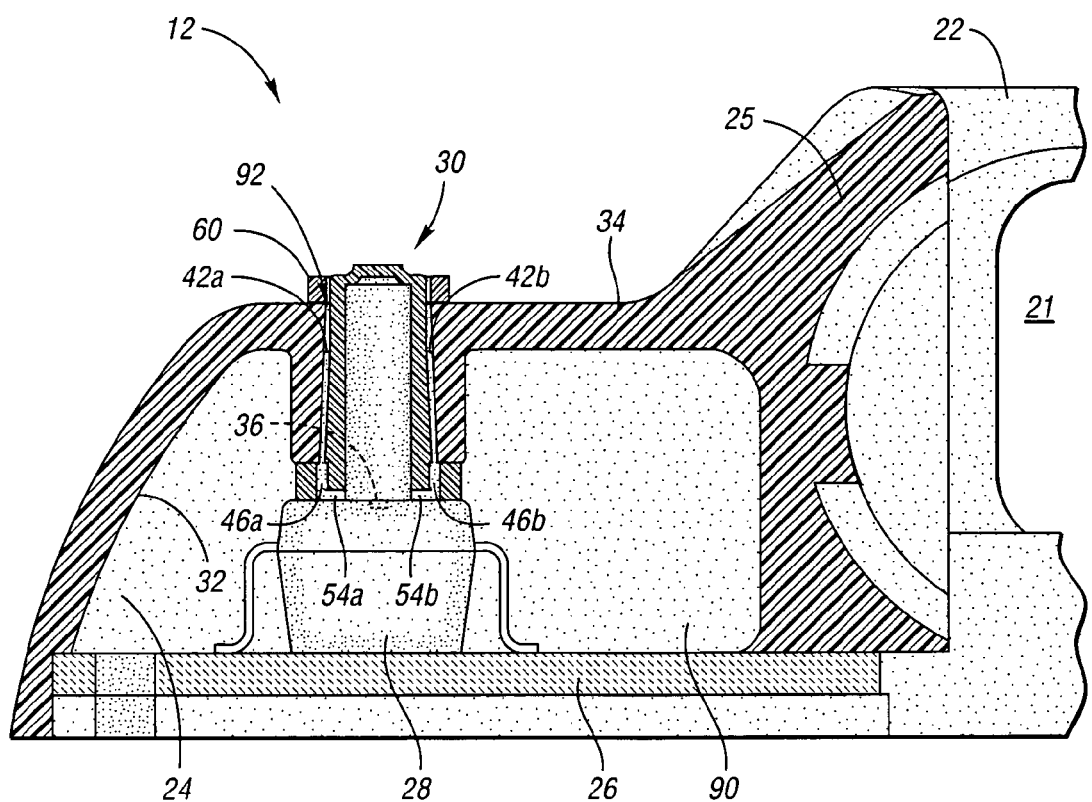
FIG. 4 is a sectional view along line 4—4 of the tire pressure monitor shown in FIG. 3.

FIG. 3 illustrates in greater detail the tire pressure monitor 12 that is attachable to the interior 18 of the vehicle wheel 16. The monitor 12 includes a housing 22. The housing 22 includes the housing opening 21 and a housing cavity 24 (FIG. 4). The monitor 12 further includes a circuit board 26 with a sensor 28 mounted thereon and a pressure cap 30. As shown in FIGS. 1 and 2, the tire pressure monitor 12 is mounted to the inside 18 of the vehicle wheel 16. Due to the high temperatures reached within the vehicle wheel 16, the housing 22 can preferably be manufactured out of a high temperature plastic such as mineral glass or a high temperature polyester. The valve stem 20 is preferably manufactured out of a high strength alloy such as aluminum.

Referring to FIG. 4, the housing 22 includes a wall 25 having an inner surface 32 and an outer surface 34. The inner surface 32 defines in part the housing cavity 24. The housing 22 includes an essentially cylindrical, but tapered wall 23 (FIG. 5) that extends into the cavity 24. The wall 23 terminates with a flat-faced bottom annular surface 56. The wall 23 defines a housing channel 58. In at least one embodiment, the housing channel 58 is substantially frusto-conical in shape.

Figure 9:
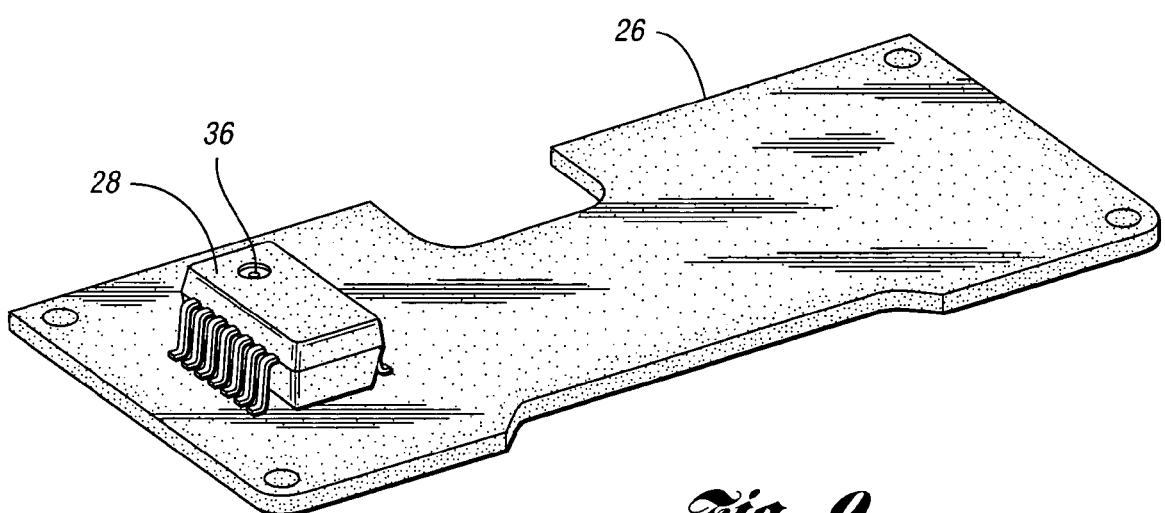
FIG. 9 is a perspective view of components of the tire pressure monitor shown in FIG. 3.

The tire pressure monitor 12 includes the circuit board 26 (FIG. 4), the sensor 28 mounted onto the circuit board 26, a battery (not shown), and a receiver (i.e., an antenna) (also not shown), both of which typically are also mounted onto the circuit board 26, all of which are contained within the housing cavity 24. The sensor 28 includes a sensor orifice 36 (FIG. 9) that is located on the top of the sensor 28. The sensor orifice 36 helps to sense the pressure within the tire and communicates with the receiver (not shown) so that a warning message, when necessary, can be sent to the LED indicator 14 within the vehicle. Although other distributors are available, the present invention preferably utilizes sensors manufactured by Beru and circuit boards manufactured by Lear Corporation.

Figure 5:
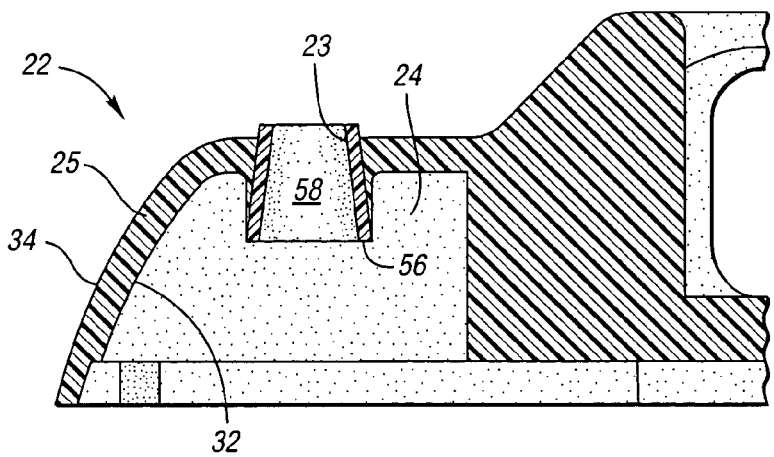
FIG. 5 is a sectional view of a portion of a component of the tire pressure monitor shown in FIG. 3.

Referring to FIGS. 4 and 5, the pressure cap 30 is designed to fit into the housing channel 58 formed by the tapered wall 23. The housing channel 58, as shown in the FIGS., has a slightly tapered shape that is designed to receive the pressure cap 30. The slightly tapered shape of the housing/channel 58 provides an interference fit with at least portions of the frusto-conical (i.e., slanted) pressure cap 30. It should be understood that the housing channel 58 and the pressure cap 30 could be configured differently, as long as a suitable seal is formed between them.

Figure 6:
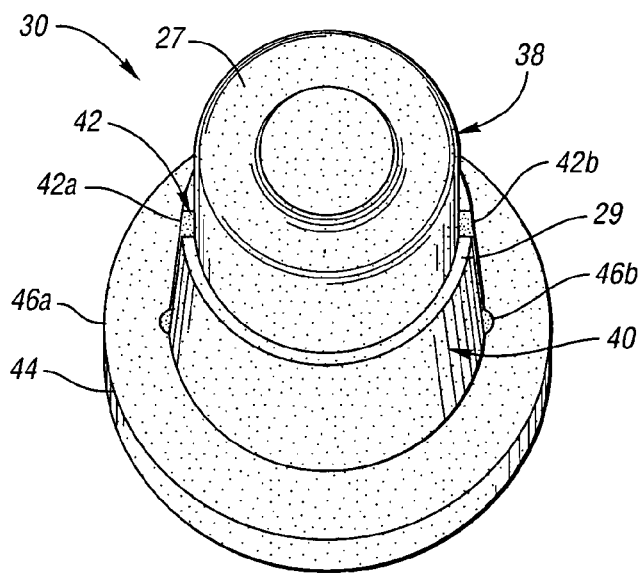
FIG. 6 is a perspective view of a component of the tire pressure monitor shown in FIG. 3.

Referring to FIG. 6, the pressure cap 30 generally comprises a substantially slanted cylindrical or frusto-conical shape configured to fit within the housing channel 58. In at least one embodiment, the pressure cap 30 includes a first generally cylindrical section 38 that is configured in at least one embodiment to have a portion, including a top cap end surface 27, projecting through to the outside of the housing 22 after insertion into the housing channel 58. In at least another embodiment, the first section 38 of the cap 30 can be frusto-conical. The first section 38 of the cap 30 has a diameter that is substantially less than the diameter of the wall 23 such that when the cap 30 is inserted in use within the wall 23, an annular space or channel 92 exists between first section 38 of the cap 30 and the wall 23. The pressure cap 30 includes a second section 40, which in at least one embodiment is frusto-conical, connected with and radially outward from the first section 38. An annular ridge 29 extends between and connects the first and second sections 38 and 40. The second section 40 further includes at least one air channel 42 that is located within the outer perimeter of the second section 40. A flat-faced annular flange section 44 projects radially outward from the distal end of the second section 40.

Figure 8:
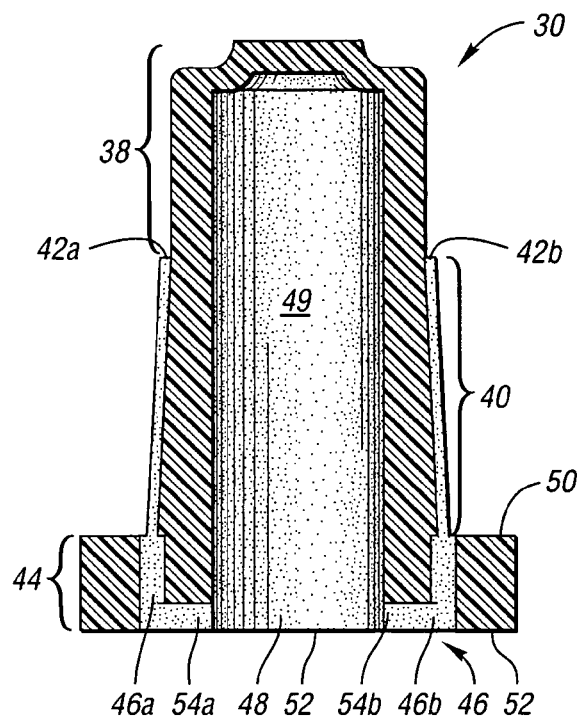
FIG. 8 is a sectional view of the component of the tire pressure monitor shown in FIG. 6.

As shown in the Figures, in one embodiment, the at least one air channel 42 includes two air channels 42a and 42b, respectively, as shown in FIGS. 6 and 8. The air channels 42a and 42b are preferably located on opposite sides of the second section 40, equidistant from each other. The air channels 42a and 42b extend substantially axially along the length of the second section 40. Although the shown embodiment includes two air channels 42a and 42b located on opposite sides of the second section 40, it is possible to have different embodiments involving fewer or more air channels at different locations on the second section 40. When the cap 30 is installed, as shown in FIG. 4, the annular conduit 92 extends from the exterior of the housing 22 (i.e., the interior 18 of the tire 16) to the air channels 42a and 42b.

Figure 7:
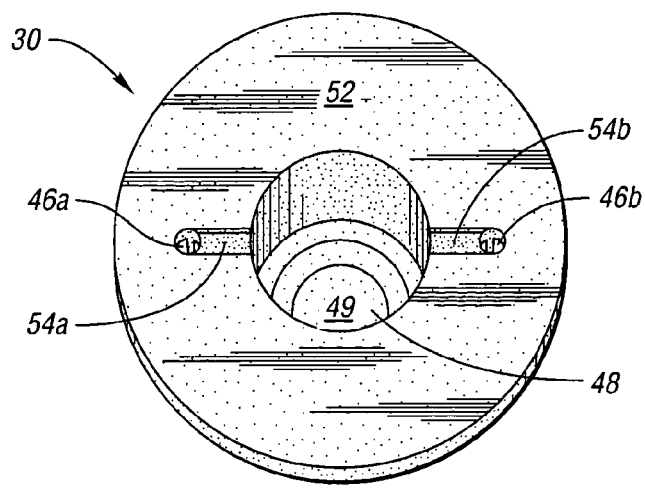
FIG. 7 is a bottom view of the component of the tire pressure monitor shown in FIG. 6.

As shown in the embodiment, illustrated in FIGS. 6, 7 and 8, the flange section 44 further comprises through holes 46a and 46b. The through holes 46a and 46b are aligned with the air channels 42a and 42b. The pressure cap 30 further includes an opening 48 in the bottom of the flange section 44 that extends through the second section 40 and the first section 38 to form an interior chamber 49 within the pressure cap 30.

As shown in the embodiment illustrated in FIGS. 7 and 8, the flange section 44 has a top surface 50 and a bottom surface 52. The through holes 46a and 46b extend entirely through the flange section 44 and are aligned with the air channels 42a and 42b of the second section 40. In at least one embodiment, the through holes 46a and 46b are located on opposite sides of the flange section 44 and are equidistant from each other. The flange section 44 also includes channels 54a and 54b that extend from the through holes 46a and 46b to the pressure cap opening 48. In the embodiment shown in the Figures, two channels 54a and 54b extend from the through holes 46a and 46b to the pressure cap opening 48 and interior chamber 49. As indicated above for the air channels 42, it is possible for there to be fewer than or more than two through holes 46 and channels 54 in the flange section 44.

Referring to FIG. 8, the air channels 42a and 42b provide conduits for air pressure to flow from the interior chamber 49 within the cap 30, or the pressure cap opening 48, to the outside of the housing 22. When the cap 30 is inserted within the housing channel 58, the conduits 42a and 42b equalize the pressure within the wheel 16 to the pressure within the interior chamber 49 in the pressure cap 30. The pressure cap 30 allows air to flow freely between the interior chamber 49/cap opening 48, the channels 54a and 54b in the flange section 44, the through holes 46a and 46b, the air channels 42a and 42b, and the outside of the tire pressure monitor 12. As indicated earlier, although the present invention involves two air channels 42a and 42b, two through holes 46a and 46b, and two flange section channels 54a and 54b, the invention will still work as indicated with any other configuration or amount.

The pressure cap 30 is preferably manufactured out of a heat resistant and compressible material, because the heat generated during rotation of vehicle wheels can reach temperatures of up to 150° C. Because of these high temperatures, a rubber material such as silicone is preferred.

During assembly of the tire pressure monitor 12, the pressure cap 30 is inserted into the housing channel 58 from the cavity 24 of the housing 22. Referring to FIG. 4, the cap 30 is pressed into the housing channel 58 until the top surface 50 of the flat-faced flange section 44 abuts against the flat-faced bottom surface 56 that surrounds the cap opening 48, forming a seal. A seal may also be formed at a location on the second section 40 below the opening for the conduit 42, between the second section 40 and the cylindrical wall 23 that forms the housing channel 58. In at least one embodiment, a portion of the first section 38 of the cap 30 projects through the housing channel 58 and to the outside of the housing 22. In at least one embodiment as shown in FIG. 4, an annular lip 60 extends upwards from the outer surface 34 of the housing wall 25 and encircles the first section 38 of the pressure cap 30. When inserted into the housing channel 58, due to the differences in diameters of the first section 38 of the cap 30 and the tapered wall 23, the annular channel (or conduit) 92 is formed therebetween. The channel 92 provides fluid communication between the channels 42a and 42b and the exterior of the housing 22, (i.e., the interior 18 of the tire 16).

After insertion of the pressure cap 30 into the housing channel 58, the circuit board 26 with sensor 28 is inserted into the bottom of the housing cavity 24. When the circuit board 26 is inserted into the housing cavity 24, the sensor 28 is compressed against the pressure cap 30 so that the cap opening 48 is aligned with the sensor orifice 36. The bottom surface 52 of the flange section 44 is in contact with and extends around the sensor orifice 36, forming a compression seal between the bottom of the flange section 52 and the orifice 36. To enable a tight and strong fit between the circuit board 26 and the housing 22, the circuit board is preferably cold-staked to the bottom of the housing 22, as is known in the art. Means other than cold-staking could be used to secure the circuit board 26 to the housing 22.

After the tire pressure monitoring system has been assembled, a liquid potting compound 90 (FIG. 4) is injected into the housing cavity 24 through holes located in the circuit board 26 (not shown). In one embodiment, the potting compound 90 can be injected into the housing cavity 24 by a low pressure orifice injector, as is known in the art. In another embodiment, the potting compound 90 can be injected into the housing cavity 24 using a gravity fill, as is also known in the art. The potting compound 90 solidifies and encapsulates the components within the housing cavity 24 to substantially prevent movement of the components due to the centrifugal force and shock caused by the rotation of the vehicle tires.

The seal formed between the bottom 52 of the flange section 44 and the sensor 28 helps to protect the orifice 36 from contamination that could be caused when the potting compound 90 is injected into the housing cavity 24. The seal helps to prevent potting compound 90 from entering the orifice 36 and clogging the sensor port of the sensor 28.

The sealing interfaces formed after the assembly of the tire pressure monitor 12 allow the air channels 42a and 42b to equalize the pressure within the tire interior 18 to the pressure within the cap opening 48, or interior chamber 49 within the cap 30. The seal formed between the second section 40 of the pressure cap 30 and the wall 23 forming the housing channel 58 allows air to flow freely through the air channels 42a and 42b to the outside of the housing 22. The seal formed between the flat-faced bottom surface 56 of the wall 23 and the top surface 50 of the flange section 44 helps to prevent air from leaking out of the housing channel 58 and also prevents potting compound 90 from contaminating the air channels 42a and 42b. When cap 30 is installed, the air channels/conduits 92, 42a and 42b, 54a and 54b and 46a and 46b to equalize the pressure within the interior chamber 49 of the cap 30 to that in the housing cavity 24 and wheel interior 18 and allow fluid communication between the interior 18 of the tire 16 and the interior chamber 49 of the cap 30, and more specifically, the sensor orifice 36.

The cap 30, when installed, provides fluid communication between cap interior chamber 49 and the interior 18 of the tire 16, while at least substantially preventing, and more preferably completely preventing, fluid communication between the housing cavity 24 and the cap interior chamber 49. In the embodiments illustrated, the seals between the flange 44 of the pressure cap 30 and the sensor 28, between the second portion 40 of the pressure cap 30 and the tapered cylindrical wall 23 of the housing 22, and between the flange 44 and the bottom surface 56 of the tapered wall 23 prevents fluid communication between the housing cavity 24 and the cap interior chamber 49. It should be understood that other configurations than those shown here could be employed to obtain the same type of seals, i.e., to prevent fluid communication.

In the embodiments illustrated, the fluid communication between the cap interior chamber 49 and the interior 18 of the tire 16 is provided via the fluid communication of conduits 54a and 54b, 46a and 46b, 42a and 42b, and 92, respectively. It should be understood that other configurations than those shown here could be employed to obtain the fluid communication between the cap chamber 48 and the interior 18 of the tire 16. For instance, one or more axial and/or radial conduits (not shown) could be provided in the first section 38 of the cap 30.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tire pressure monitor system located within the interior of a tire, the system comprising:

a housing having a wall forming a cavity, the housing further having an interior wall forming a chamber in fluid communication with the cavity;

a tire pressure sensor located within the housing cavity, the sensor having an orifice for helping to sense tire pressure; and a pressure cap inserted into the housing chamber, the pressure cap comprising a wall having a portion that contacts the sensor and extends around the sensor orifice, the pressure cap substantially blocking fluid communication between the senor orifice and the housing cavity while providing fluid communication between the senor orifice and the exterior of the housing.

2. The system of claim 1 wherein the pressure cap encircles the sensor orifice.

3. The system of claim 2 wherein the pressure cap has at least a first conduit in fluid communication between the sensor orifice and the exterior of the housing.

4. The system of claim 1 wherein the pressure cap is made of a heat-resistant compressible material.

5. The system of claim 1 wherein at least a first portion of the pressure cap is not in interference fit with the housing chamber and a second portion of the pressure cap is in interference fit with the housing chamber.

6. The system of claim 1 wherein the pressure cap is substantially frusto-conical in shape.

7. The pressure cap of claim 6 wherein the pressure cap comprises a first frusto-conical section and a second frusto-conical section that is connected with and radially outward from the first section.

8. The pressure cap of claim 3 wherein the interior wall has a first wall portion adjacent a first cap portion of the pressure cap, the first wall portion of the interior wall having a first diameter, and the first cap portion of the pressure cap having a second diameter smaller than the first diameter so that a second conduit is formed between the first wall portion and the first cap portion, the second conduit being in fluid communication with the first conduit.

9. A pressure cap for use with a tire pressure monitor, the monitor comprising a housing having a wall forming a cavity and an interior wall forming a chamber in fluid communication with the cavity and an air pressure sensor within the housing, the cap comprising:

a cap wall which when inserted within the chamber extends between the housing wall and the sensor and extends around the sensor orifice and substantially blocks fluid communication between the sensor orifice and the housing cavity while providing fluid communication between the sensor orifice and the exterior of the housing.

10. The pressure cap of claim 9 wherein the pressure cap encircles the sensor orifice.

11. The pressure cap of claim 9 wherein the pressure cap has at least a first conduit in fluid communication between the sensor orifice and the exterior of the housing.

12. The pressure cap of claim 9 wherein at least a portion of the pressure cap is in interference fit with the housing opening.

13. The pressure cap of claim 9 wherein the pressure cap comprises a first frusto-conical section and a second frusto-conical section that is connected with and radially outward from the first section.

14. The pressure cap of claim 9 wherein the interior wall has a first wall portion adjacent a first cap portion of the pressure cap, the first wall portion of the interior wall having a first diameter, and the first cap portion of the pressure cap having a second diameter smaller than the first diameter so that a second conduit is formed between the first wall portion and the first cap portion, the second conduit being in fluid communication with the first conduit.

15. A method for manufacturing a tire pressure monitoring system located within the interior of a tire, the method comprising:

providing a housing having a wall forming a cavity and having an interior wall forming a chamber in fluid communication with the cavity;

locating a tire pressure sensor within the housing cavity, the sensor having an orifice for helping to sense tire pressure; and locating a pressure cap into the housing chamber, the pressure cap comprising a wall having a portion that contacts the sensor and extends around the sensor orifice wherein the pressure cap substantially blocks fluid communication between the sensor orifice and the housing cavity, the pressure cap having at least a first conduit providing fluid communication between the sensor orifice and the exterior of the housing.

16. The method of claim 15 wherein the pressure cap encircles the sensor orifice.

17. The method of claim 15 wherein at least a portion of the pressure cap is in interference fit with the housing opening.

18. The method of claim 15 wherein the pressure cap comprises a first frusto-conical section and a second frusto-conical section that is connected with and radially outward from the first section.

19. The method of claim 15 wherein the interior wall has a first wall portion adjacent a first cap portion of the pressure cap, the first wall portion of the interior wall having a first diameter, and the first cap portion of the pressure cap having a second diameter smaller than the first diameter so that a second conduit is formed between the first wall portion and the first cap portion, the second conduit being in fluid communication with the first conduit.

* * * * *

UNITED STATES PATENT AND TRADEMARK OFFICE
CERTIFICATE OF CORRECTION

PATENT NO. : 7,028,541 B2  Page 1 of 1
APPLICATION NO. : 10/700718
DATED : April 18, 2006
INVENTOR(S) : Michael Uleski et al..

It is certified that error appears in the above-identified patent and that said Letters Patent is hereby corrected as shown below:

Column 7, Line 11, Claim 1,   Delete "senor" and insert therfor --sensor--.

Column 7, Line 13, Claim 1,   Delete "senor" and insert therfor --sensor--.

Signed and Sealed this

Fifteenth Day of August, 2006

JON W. DUDAS
*Director of the United States Patent and Trademark Office*